(12) United States Patent
Wen et al.

(10) Patent No.: US 9,924,183 B2
(45) Date of Patent: Mar. 20, 2018

(54) FAST HEVC TRANSCODING

(71) Applicant: NANJING YUYAN INFORMATION TECHNOLOGY LTD.

(72) Inventors: Jiangtao Wen, La Jolla, CA (US); Yucong Chen, Beijing (CN); Ziyu Wen, Beijing (CN); Tong Shen, Beijing (CN)

(73) Assignee: NANJING YUYAN INFORMATION TECHNOLOGY LTD., Nanjing (CN)

( * ) Notice: Subject to any disclaimer, the term of this patent is extended or adjusted under 35 U.S.C. 154(b) by 336 days.

(21) Appl. No.: 14/663,312

(22) Filed: Mar. 19, 2015

(65) Prior Publication Data

US 2015/0271510 A1 Sep. 24, 2015

Related U.S. Application Data

(60) Provisional application No. 61/955,940, filed on Mar. 20, 2014.

(51) Int. Cl.
| | |
|---|---|
| *H04N 19/96* | (2014.01) |
| *H04N 19/40* | (2014.01) |
| *H04N 19/86* | (2014.01) |
| *H04N 19/61* | (2014.01) |
| *H04N 19/119* | (2014.01) |
| *H04N 19/176* | (2014.01) |
| *H04N 19/147* | (2014.01) |
| *H04N 19/436* | (2014.01) |

(52) U.S. Cl.
CPC ........... *H04N 19/40* (2014.11); *H04N 19/119* (2014.11); *H04N 19/147* (2014.11); *H04N 19/176* (2014.11); *H04N 19/436* (2014.11)

(58) Field of Classification Search
CPC .. H04N 19/119; H04N 19/147; H04N 19/176; H04N 19/40; H04N 19/436
USPC ...................................... 375/240.02
See application file for complete search history.

(56) References Cited

U.S. PATENT DOCUMENTS

| | | | |
|---|---|---|---|
| 8,644,390 B2 * | 2/2014 | Joch ..................... | H04N 19/176 375/240.12 |
| 2011/0038422 A1 * | 2/2011 | Cheon .................. | H04N 19/147 375/240.18 |
| 2012/0195366 A1 * | 8/2012 | Liu ....................... | H04N 19/159 375/240.02 |

(Continued)

OTHER PUBLICATIONS

Dong Zhang, Fast Transcoding From H.264/AVE to High Efficiency Video Coding, 2012, IEEE, pp. 651-656.*

*Primary Examiner* — Jorge L Ortiz Criado
*Assistant Examiner* — Yong Joon Kwon
(74) *Attorney, Agent, or Firm* — Gokalp Bayramoglu

(57) ABSTRACT

The emerging High Efficiency Video Coding (HEVC) standard achieves significant performance improvement over H.264/AVC standard at a cost of much higher complexity. An H.264/AVC to HEVC transcoder is described for multi-core processors implementing Wavefront Parallel Processing (WPP) and SIMD acceleration, along with expedited motion estimation (ME) and mode decision (MD) by utilizing information extracted from the input H.264/AVC stream. Experiments using standard HEVC test bitstreams show that the described transcoder may achieve a 70× speed up over the HEVC HM S.1 reference software (including H.264 encoding) at very small rate distortion (RD) performance loss.

18 Claims, 13 Drawing Sheets

(56) References Cited

U.S. PATENT DOCUMENTS

| | | | |
|---|---|---|---|
| 2013/0022127 A1* | 1/2013 | Park | H04N 19/52 375/240.16 |
| 2013/0142259 A1* | 6/2013 | Lim | H04N 19/00545 375/240.12 |
| 2013/0202051 A1* | 8/2013 | Zhou | H04N 19/436 375/240.26 |
| 2013/0301707 A1* | 11/2013 | Lai | H04N 19/0009 375/240.03 |
| 2014/0101328 A1* | 4/2014 | Coulombe | H04L 65/607 709/231 |
| 2014/0254670 A1* | 9/2014 | Kwon | H04N 19/176 375/240.12 |
| 2015/0022633 A1* | 1/2015 | Zhang | H04N 19/597 348/43 |
| 2015/0264405 A1* | 9/2015 | Zhang | H04N 19/126 375/240.18 |
| 2016/0007050 A1* | 1/2016 | Rusert | H04N 19/56 375/240.08 |
| 2016/0234511 A1* | 8/2016 | Zheng | H04N 19/176 |

* cited by examiner

FAST HEVC TRANSCODING

CROSS-REFERENCE TO RELATED APPLICATIONS

This application claims priority to U.S. Provisional Patent Application No. 61/955,940 filed Mar. 20, 2014, the entire contents of which are hereby incorporated by reference.

STATEMENT RE: FEDERALLY SPONSORED RESEARCH/DEVELOPMENT

Not Applicable

BACKGROUND

The current application is directed to providing an H.265/HEVC encoded video and in particular to transcoding an H.264/AVC encoded video to H.265/HEVC.

The latest High Efficiency Video Coding (HEVC) standard developed by Joint Collaborative Team on Video Coding (JCT-VT) was designed to succeed the H.264/AVC standard with about 50% improvement in compression efficiency. It is rapidly being adopted in many applications as a result of its superior compression performance. However, compared with the H.264/AVC standard, the computational complexity of HEVC encoding is extremely high, making it hard to be implemented in software on general purpose processors widely used in cloud-based multimedia encoding/transcoding systems and also limiting its adoption in real-time systems.

Because of the large amount of existing legacy content already encoded with the H.264/AVC standard, a transcoder transcoding pre-encoded H.264/AVC bitstreams into HEVC bitstreams rapidly may be of great value.

BRIEF SUMMARY

In accordance with the present disclosure, there is provided a method for generating an H.265 HEVC bitstream comprising: parsing a previously encoded bitstream to extract picture frame information and decoding information; for each picture frame of the picture frame information: partitioning the picture frame into a plurality of coding tree units (CTUs); determining further partitioning of each CTU of the plurality of CTUs based on the extracted decoding information; determining a mode for each partition based on the decoding information; and encoding each partition according to the determined mode; and combining the encoded partitions into the H.265 HEVC bitstream.

In accordance with the present disclosure, there is further provided a computing system for generating an H.265 HEVC bitstream comprising: a processor for executing instructions stored in memory; and a memory storing instructions, which when executed by the processor configure the computing system to: parse a previously encoded bitstream to extract picture frame information and decoding information; for each picture frame of the picture frame information: partition the picture frame into a plurality of coding tree units (CTUs); determine further partitioning of each CTU of the plurality of CTUs based on the extracted decoding information; determine a mode for each partition based on the decoding information; and encode each partition according to the determined mode; and combine the encoded partitions into the H.265 HEVC bitstream.

DETAILED DESCRIPTION

There is a large amount of existing content already encoded with the H.264/AVC (Advanced Video Coding) standard. A transcoder transcoding pre-encoded H.264/AVC bitstreams into H.265 HEVC (High Efficiency Video Coding) bitstreams rapidly is of great value, especially before low cost, good quality HEVC encoders become widely available, and/or before HEVC becomes universally supported for devices such as set-top-boxes, tablets and mobile phones and in applications such as streaming video over networks. There are inherent similarities between the H.264/AVC and the H.265/HEVC standards that allow information to be re-used when transcoding in order to speed up the process. In addition to using a transcoder to transcode existing H.264 encoded files, an H.264/AVC encoder working in tandem with an H.264 to HEVC transcoder as described herein may provide a cost-effective means of conducting HEVC encoding for many applications in the absence of dedicated HEVC encoders. Although the subsequent is directed at H.264/AVC to HEVC transcoding, the same techniques described may be applied to transcoding from the MPEG-2, H.263, VP8/VP9, and AVS video coding standards to HEVC, or cascade an MPEG-2, H.263, VP8/VP9 and AVS encoder with a transcoder to HEVC to facilitate HEVC encoding from raw uncompressed video. All these coding standards share a similar bitstream structure as for H.264/AVC.

An H.264/AVC to HEVC transcoder system is described herein that utilizes motion vector (MV) information, encoding mode (or simply mode) information and other information extracted from the input H.264/AVC bitstream to expedite the composition of the output H.265/HEVC bitstream. Various fast algorithms for performing key encoding tasks are also described. In one implementation of the described transcoder, when compared with the HM 8.1 HEVC reference software, the implemented transcoder is capable of achieving a 70:1 speed up ratio without significant loss in the rate distortion (RD) performance. The transcoder described herein transcodes the input bitstream to a different bitrate and format while the resolution remains unchanged.

Figure 1:
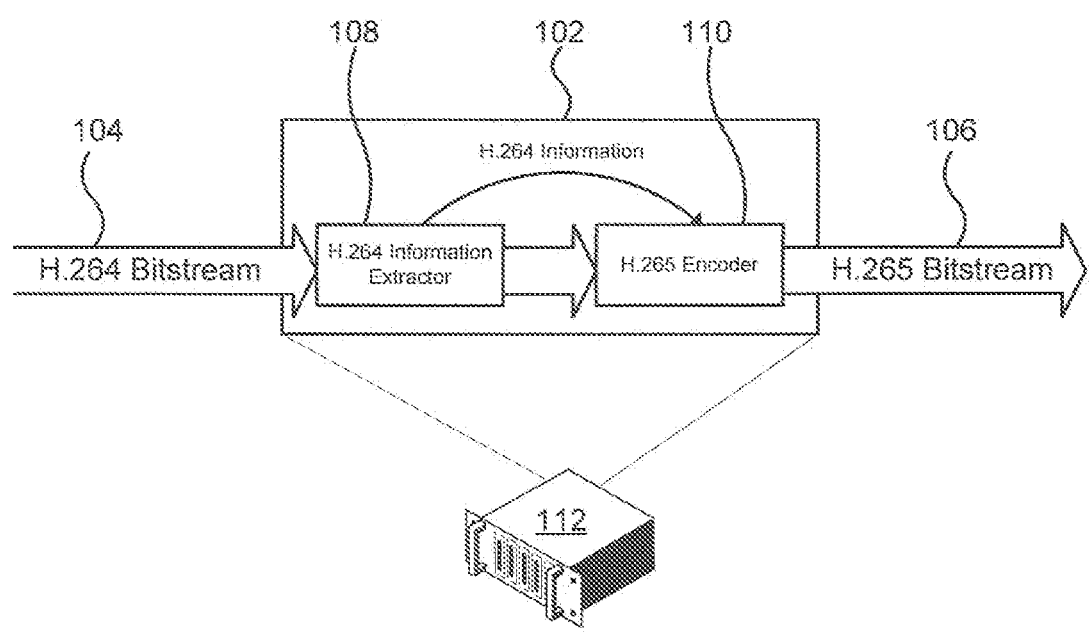
FIG. 1 depicts an H.264 to H.265 transcoder.

FIG. 1 depicts a transcoder system. The transcoder system 100 comprises transcoder functionality 102 that receives an H.264/AVC bitstream 104 and outputs an HEVC bitstream 106. The transcoder functionality includes functionality 108 that extracts H.264 information from the bitstream 104 including motion vector (MV) information, encoding mode information and other information such as partition sizes, and reference pictures. The extracted information is used by H.265 encoding functionality 110 in order to speed up the H.265 encoding process.

As depicted in FIG. 1, the transcoder functionality 102 can be implemented across a in a computing system 112, that may include for example an Intel Core i7 processors with 8 GB of RAM. It will be appreciated that the system 112 may utilize different hardware including slower hardware, although processing times for producing the output bitstream will increase. Further, although not depicted in FIG. 1, the system 112 may be also be connected to a network for transferring data.

Figure 2:
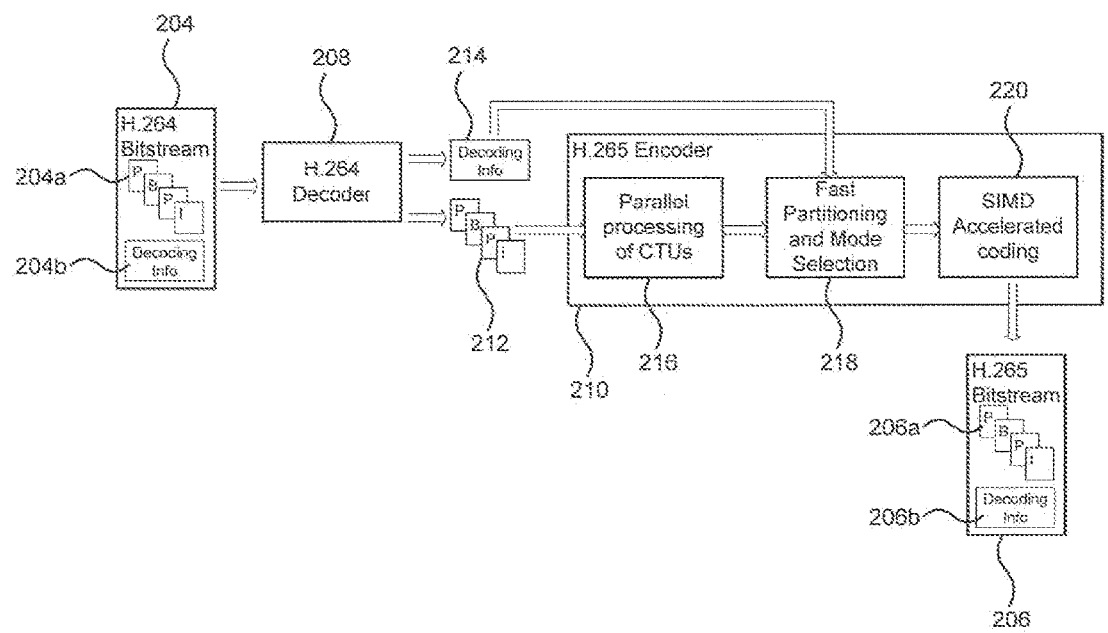
FIG. 2 depicts further details of an H.264 to H.265 transcoder.

FIG. 2 depicts further details of an H.264 to H.265 transcoder system. The system 200 comprises H.264 decoder functionality 208 for decoding an H.264 bitstream 204. As depicted, the H.264 bitstream 204 comprises picture frame information 204a comprising encoded information representing frames of the video. The frames may be encoded as an 'I' frame, which can be decoded independent of other frames of the video, a 'P' frame which is predicted from a single previous frame or a 'B' frame which is predicted from earlier and/or later frames. The bitstream 204 also comprises decoding information 204b that is used in decoding the picture frame information 204. The decoding information 204b includes information about how the video was encoded and so, how the bitstream can be decoded. The decoding information 204b may include, for example, information on partitioning of macroblocks, prediction types of macroblocks, or sub-macroblocks if partitioned, prediction modes, reference frames and motion vectors. The H.264 decoder decodes, or at least partially decodes, the bitstream to provide the decoding information 214 and the encoded picture frames 212, which are used in generating the H.265 output bitstream 206. The H.265 bitsream is similar to the bitstream 204, however it will have a lower bitrate, and different format. However, the bitstream 206 will include encoded picture frame information 206a as well as decoding information 206b.

As is shown in FIG. 2, the transcoder comprises three processing levels of, namely, high-level parallel processing 216, mid-level fast partitioning and mode decision processing 218 and low-level SIMD coding accelerations 220. The high-level parallel processing 216 makes it possible for the encoder to run on multiple threads while maintaining high RD performance. The high level processing 216 uses wavefront parallel processing (WPP) to allow multiple coding tree units (CTUs) to be encoded in parallel. The mid-level fast partitioning and mode decision processing 218 utilizes decoding information 204b extracted from the incoming H.264/AVC bitstream 204 to expedite the determination of partition sizes, prediction modes and motion vectors to be used for the RD optimized HEVC bitstream. The extracted H.264 decoding information is used to expedite the motion estimation (ME) and mode decision (MD) processes. The low-level SIMD coding accelerations 220 further optimize SIMD-prone vector operations of the coding process using instruction set support of the processor.

Figure 3:
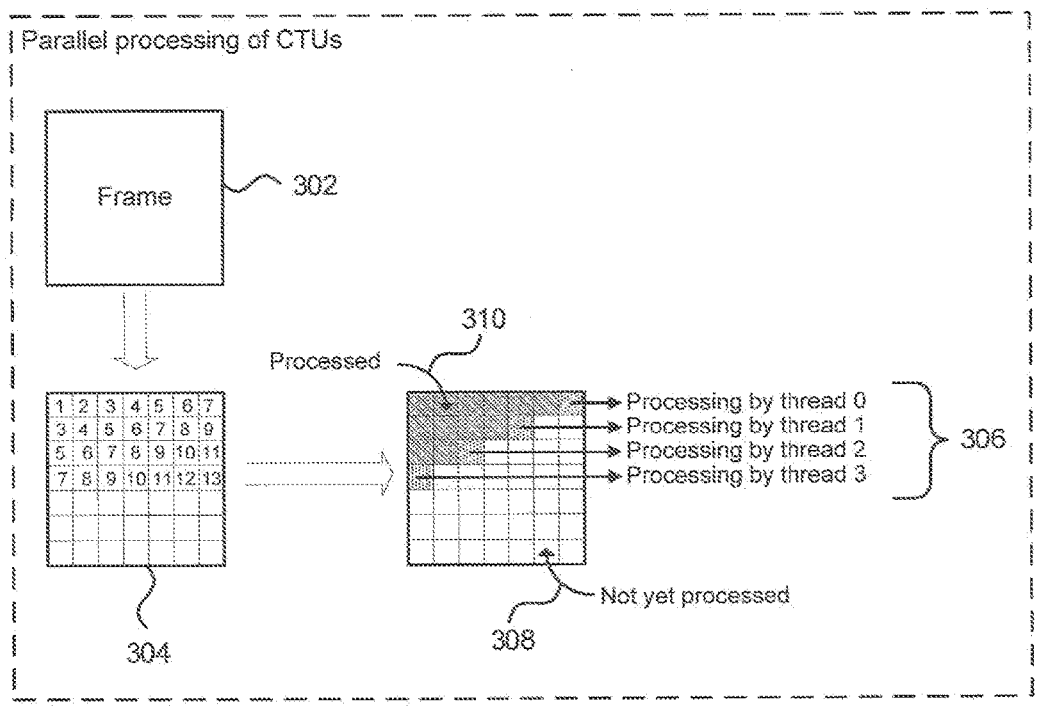
FIG. 3 depicts a wavefront parallel processing technique.

FIG. 3 depicts a wavefront parallel processing technique. The wavefront parallel processing (WPP) technique may be used in the parallel processing of CTUs described above with reference to FIG. 2. As depicted, a picture frame 302 is partitioned into a number of equally sized 'blocks' or coding tree units 304. The HEVC standard allows for CTUs to be 64×64 samples, 32×32 samples or 16×16 samples. The WPP technique controls the order in which the CTUs are processed. As depicted in FIG. 3, each CTU 304 in a row of the picture may be assigned an integer number increasing by one from left to right. The numbering of each of the rows of CTUs increases by two going down. The assigned indexes indicate a processing order of the CTU, so that CTUs with smaller indexes are encoded earlier. Further, the CTUs having the same index value can be encoded in parallel by different threads. As depicted in FIG. 3, a 'wavefront' of CTUs 306 in each row can be processed by different threads running on different cores. The processing 'wavefront' proceeds to those CTUs that are not yet processed 308 until all CTUs are processed 310. In WPP, the predictions required for encoding a particular CTU are only dependent upon the reconstructed CTU located at the particular CTU's top-right. That is, once the CTU above and to the right of a particular CTU is processed, the particular CTU may be processed since all required information will be available. Accordingly, encoding of a CTU can begin immediately after its top-right CTU has been encoded. Further the context models used by the entropy coder are dependent on the previous CTU, which can be resolved by initializing the context model for each row.

Considering only the time for required for CTU encoding, when WPP is enabled, the encoding of a CTU can start as soon as its neighbor on the top-right has been encoded. For example, both the first CTU in the second row and the third CTU in the first row can be encoded immediately following completion of the encoding of the second CTU in the first row.

If w and h are the number of CTUs in the frame's width and height, and assuming each CTU requires the same encoding time, which is not the case however it highlights the speedup resulting from WPP, the speedup ratio of parallel processing provided by WPP is w*h/(2 h+w−2). The ratio is roughly 5.7 for 720p video and a MaxCTUSize of 64. For 1080p and MaxCTUSize of 64, the ratio is 8.2. Considering that most mainstream servers have 4 to 8 cores, such a speedup is sufficient for fully utilizing a multi-core processor using WPP.

Figure 4:
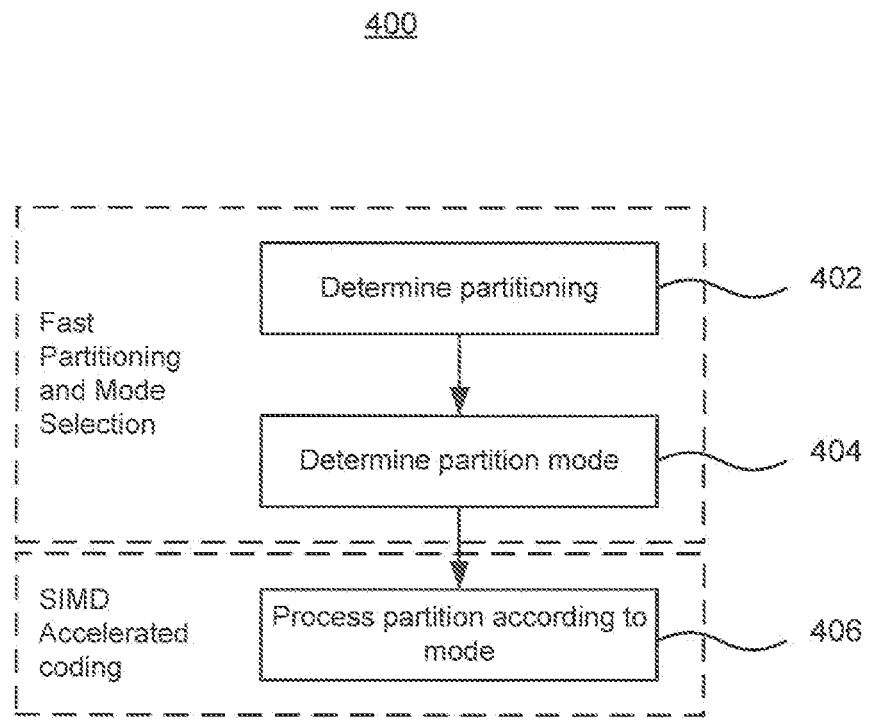
FIG. 4 depicts a method of processing a coding tree unit (CTU)

FIG. 4 depicts a method of processing a coding tree unit (CTU). Each CTU in a frame is processed to generate corresponding bitstream information that is used in constructing the final H.265 bitstream. As previously described, the CTUs are processed by a mid-level fast partitioning and mode decision process and the results from the mid level processing are then processed by SIMD accelerated coding that results in generating the corresponding bitstream information. The fast partitioning and mode decision processing involves determining the partitioning of the CTU (402) and then for each of the determined partitions determining a mode for the partition (404). Both the partitioning process and the mode decision process are accelerated by utilizing extracted decoding information of the H.264 bitstream. Once the partition mode is determined for the partitions, the partitions can be processed according to the determined mode (406). The processing of the partitions is done using SIMD accelerated coding techniques that can perform the same operation on multiple pieces of data simultaneously (i.e. Single Instruction, Multiple Data).

Figure 5:
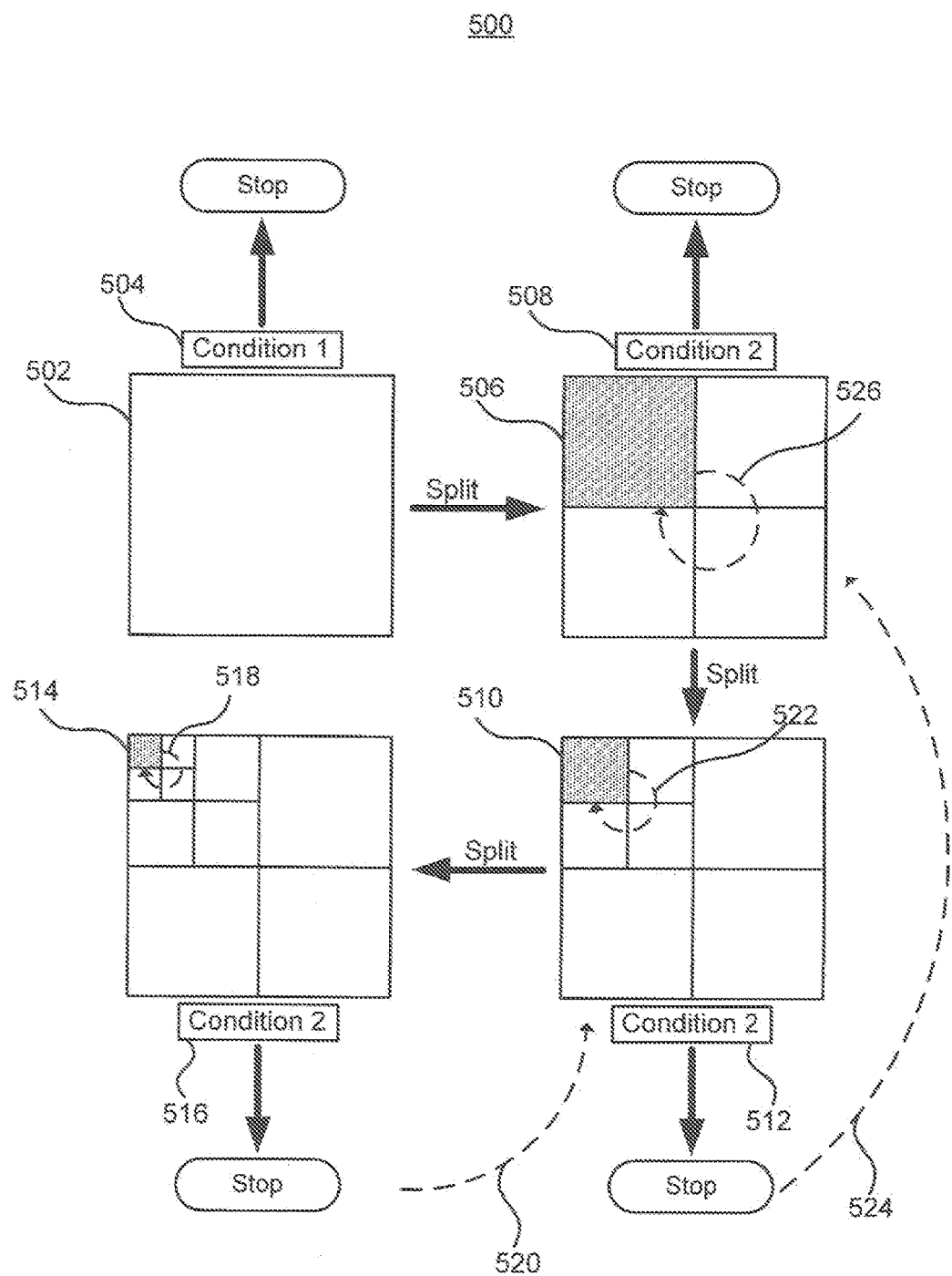
FIG. 5 depicts a fast partitioning strategy.

FIG. 5 depicts a fast partitioning strategy. The strategy 500 depicted in FIG. 5 is used in partitioning P and B frames. The high computational complexity of HEVC for mode decision for P/B frames arises from the large possible combinations of different block sizes for every CTU and different mode partitions for every size, as well as motion estimation for every partition. To simplify P/B frame partitioning and mode decision, and as such speedup the process, information extracted from the H.264/AVC bitstream is utilized.

Based on experiments, the benefit of using the block size of 64×64 was not significant enough to justify the additional computational complexity in mode decision, and as such, the largest CTU, and so CU, is restricted to 32×32. Furthermore, in contrast to the HM 8.1 reference software which recursively and exhaustively divides every block to all possible smaller sizes, the current transcoder utilizes early termination for each of the block sizes based on extracted H.264 decoding information. In the early termination process depicted in FIG. 5, further recursive division of blocks is skipped on one of two conditions, one based on a probability model and the other one RD cost between the current CU size and the spatially previous CU size.

As depicted in FIG. 5, an initial CU 502 is checked against a first termination condition "Condition 1" 504, and if the condition is satisfied, no partitioning of the CU is performed. If however, the Condition 1 504 is not satisfied, the CU is split into equal sized partitions and the first of the partitions 506 is processed to determine if it should be split further. Each of the partitions resulting from the split are processed as depicted by circular dotted arrow 526, however the processing of the further partitions may be done recursively. The partition 506, which is a CU or a Prediction Unit (PU), is processed, as indicated schematically by the shading in FIG. 5, in order to determine if CU 506 satisfies a second condition "Condition 2" 508. If the condition 508 is met, the CU 506 is not split further and the next CU of the level, if any, is processed. If, however, the condition 508 is not met the CU 506 is further split into equal sized partitions and the first of these partitions 510 is processed to determine if it should be split further. Again each of the partitions at the particular depth will be processed to determine if they should be split further as represented schematically by circular dotted arrow 522. If the CU 510 meets condition 2 512, the CU is not split and processing returns 524 to the previous partition level for processing the next CU. If the CU 510 does not satisfy condition 2 512, the CU 510 is split further and the resulting partitions 514 are compared to condition 2 516. Once all of the partitions 514 are processed as depicted by circular dotted line 518, the processing returns 524 to the previous partitioning level, or division depth, and the remaining partitions, or rather CUs are processed.

The probability condition (Condition 1 above) was established based on analysis of the distributions of the different block sizes as a function of the encoding quantization parameter (QP). Some of the results are given in Table 1 below.

TABLE 1

Depth Distribution

| Video Clip | QP | Depth Distribution (%) | | | | Video Clip | QP | Depth Distribution (%) | | | |
|---|---|---|---|---|---|---|---|---|---|---|---|
| | | 0 | 1 | 2 | 3 | | | 0 | 1 | 2 | 3 |
| BasketballDrill (832 × 480) | 22 | 21.85 | 32.92 | 26.88 | 18.35 | BQSquare (416 × 240) | 22 | 0.39 | 17.14 | 50.93 | 31.54 |
| | 27 | 32.24 | 32.69 | 23.48 | 11.59 | | 27 | 6.46 | 38.86 | 35.96 | 18.72 |
| | 32 | 40.05 | 34.57 | 19.08 | 6.30 | | 32 | 20.50 | 46.61 | 21.07 | 11.82 |
| | 37 | 46.87 | 35.48 | 14.40 | 3.25 | | 37 | 31.43 | 46.11 | 16.11 | 6.35 |
| ChinaSpeed (1024 × 768) | 22 | 17.14 | 33.32 | 28.29 | 21.25 | Chromakey (720 × 480) | 22 | 15.75 | 46.76 | 30.30 | 7.19 |
| | 27 | 27.05 | 35.35 | 23.34 | 14.26 | | 27 | 31.80 | 45.30 | 20.12 | 2.78 |
| | 32 | 38.23 | 33.98 | 18.59 | 9.20 | | 32 | 48.49 | 35.94 | 14.27 | 1.30 |
| | 37 | 51.65 | 31.08 | 12.33 | 4.94 | | 37 | 59.46 | 28.45 | 11.68 | 0.41 |
| Kimono (1920 × 1080) | 22 | 15.97 | 59.41 | 22.13 | 2.49 | Traffic (2560 × 1600) | 22 | 25.16 | 32.21 | 29.98 | 12.65 |
| | 27 | 26.97 | 55.69 | 16.09 | 1.25 | | 27 | 44.81 | 30.13 | 18.95 | 6.11 |
| | 32 | 39.05 | 49.23 | 11.10 | 0.62 | | 32 | 58.82 | 26.63 | 11.73 | 2.82 |
| | 37 | 53.28 | 40.33 | 6.15 | 0.24 | | 37 | 70.10 | 22.07 | 6.73 | 1.10 |

Table 1 provides some insights to the relationship between the depths of the block size division and the QPs and resolutions. Intuitively and as confirmed by the results in Table 1, the smaller the video resolution, the deeper the block size division, i.e. more blocks of smaller sizes will be used. On the other hand, the optimal block sizes for lower bitrates (higher QPs) tend to be larger (lower division depth), as larger block sizes will lead to fewer blocks in a frame, thereby reducing mode and block-level header information. Therefore, Condition 1 can be formulated as:

$$P = P1 + P2 + P3 \quad (1)$$

$$P1 = \frac{w - 400}{20} + (QP - 20) * 2 \quad (2)$$

$$P2 = (n - 2) * 10 \quad (3)$$

where P represents the probability to STOP further splitting, P1 is related to the resolution and QP of the video, P2 is decided by the H.264/AVC information and P3 is based on whether the previous frame is decided by Condition 1 to STOP. For P1, w is the width of the video and it ranges from 400 to 1400, QP is the value of quantization decided by encoder which ranges from 20 to 40. If the actual values exceed the ranges set above, the value will be set at the border. For example, if the actual width is 2000, it will be calculated with a width of 1400. For P2, n stands for the number of 16×16 mode blocks of 4 macro block (MB)s covered by a corresponding 32×32 Cu. In this way, n ranges from 0 to 4. For P3, if the previous frame is decided by condition 1 to STOP, P3=10, else P3=−10. If P is calculated to be above a certain threshold, further splitting is stopped.

Stopping "Condition 2" is based on the assumption that the motion costs for different depths is monotonic with regard to the block size. In the current transcoder, according to Condition 2 used in the fast partitioning of CUs, if the RD cost for the current block size is greater than alpha times the RD cost of the next larger block size, which will have already been calculated in the process, further block division is no longer carried out. Based on experiments, alpha is set according to:

$$\text{alpha} = 1 - \frac{w - 400}{1000} \qquad (4)$$

where w represents the width of the video, which ranges from 400 to 1400. If w is lower than 400, alpha=1, or if w is higher than 1400, alpha=0.

The fast partitioning for I frames is similar in concept to the partitioning decision for P and B frames described above. To determine Intra block sizes, the same general process depicted in FIG. 5 is applied. The same Condition 2 used for P and B frames is used for I frames, however, Condition 1 is modified to the following:

$$P = P1 + P2 \qquad (5)$$

The definitions of P1 and P2 in equation (5) are the same as defined in equations (2) and (3).

Figure 6:
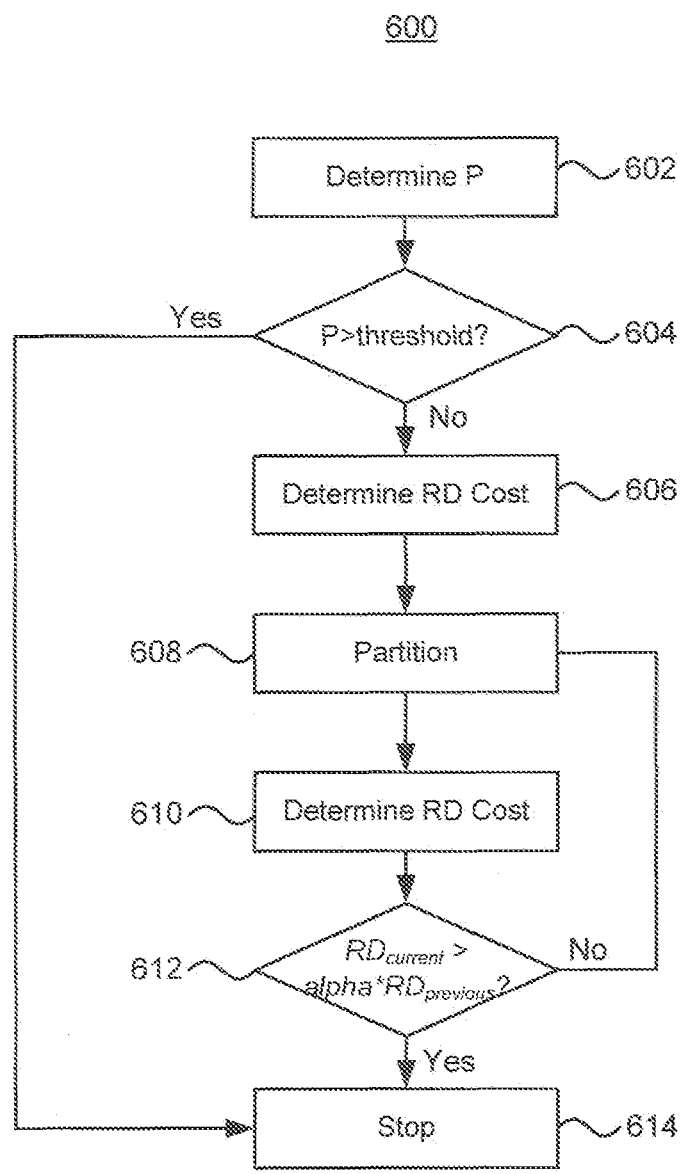
FIG. 6 depicts a method of fast partitioning.

FIG. 6 depicts a method of fast partitioning. The method 600 may be used in performing the process described above with reference to FIG. 5. The method 600 begins with processing a CU of the maximum size, that is the method begins with a CU that has not been further partitioned. A value for P is determined (602) for the CU according to (1) above for P and B frames, or according to (5) above for I frames. It is determined if the determined value of P is above a certain threshold (604) and if it is (Yes at 604) partitioning of the CU stops (614). If P is not above the threshold (No at 604), the RD cost of the current division depth is determined (606) and then the CU is partitioned (608). Once partitioned, each of the individual partitions are individually processed by determining the RD cost at the current division depth (610) and comparing the RD cost of the current division depth to the RD cost of the previous division depth. It is determined (612) whether or not the current RD cost is greater than alpha times the previous RD cost, where alpha is calculated according to (4) above. If $RD_{current}$ is greater (Yes at 612) further partitioning is stopped (614) and another partition can be recursively processed. If it is determined that the current RD cost is not greater than alpha times the previous RD cost (No at 612), the CU is further partitioned (608) and the same process of determining the RD cost of the current division depth is performed to determine if further partitioning should be performed.

As described above, a CTU can be partitioned into smaller units (either CUs or Prediction Units—PUs). The partitioning information describing how a particular CTU is partitioned can be described by a quadtree, or other similar structure. Once the partitioning size is determined, the mode for the partitions can be determined.

With regard to the partition mode determination, the problem is divided into two parts according to the sizes of the CU (or PU) for which the mode is being determined. One case is when the size of the CU is 32×32 and the other is when the size of the CU is less than or equal to 16×16.

For the 32×32 case, HEVC allows for various Asymetric Motion Partitioning (AMP) modes. However, based on experiments, the RD gain for the AMP modes is limited but the processing required is relatively consuming. Accordingly, the AMP modes are not considered. Accordingly, a partition will be encoded in one of six modes. They are: Skip, Merge, Inter2N×2N, InterN×2N, Inter2N×N and Intra2N×2N. Rather than exhaustively checking which of the six modes provides the best result, and as such should be used, a subset of the six modes can be selected for further checking based on the extracted H.264 decoding information. Since Skip and Merge are not complex to compute and the cost of not checking them is severe, the Skip and Merge modes are always checked. Whether the remaining four modes will be checked depends on the extracted H.264 decoding information. In particular, the encoding modes of the four macroblocks covered by the 32×32 CU being considered are used to determine the modes of the CU to check as follows:

Inter2N×2N mode is checked when there are more than 2 MBs using Inter16×16 mode;

InterN×2N mode is checked when the left two MBs, or the right two MBs both use Inter16×16 mode;

Inter2N×N mode is checked when the upper two MBs or the lower two MBs both use Inter16×16 mode; and Intra2N×2N mode is checked when there exists more than 2 MBs using Intra modes.

Figure 7:
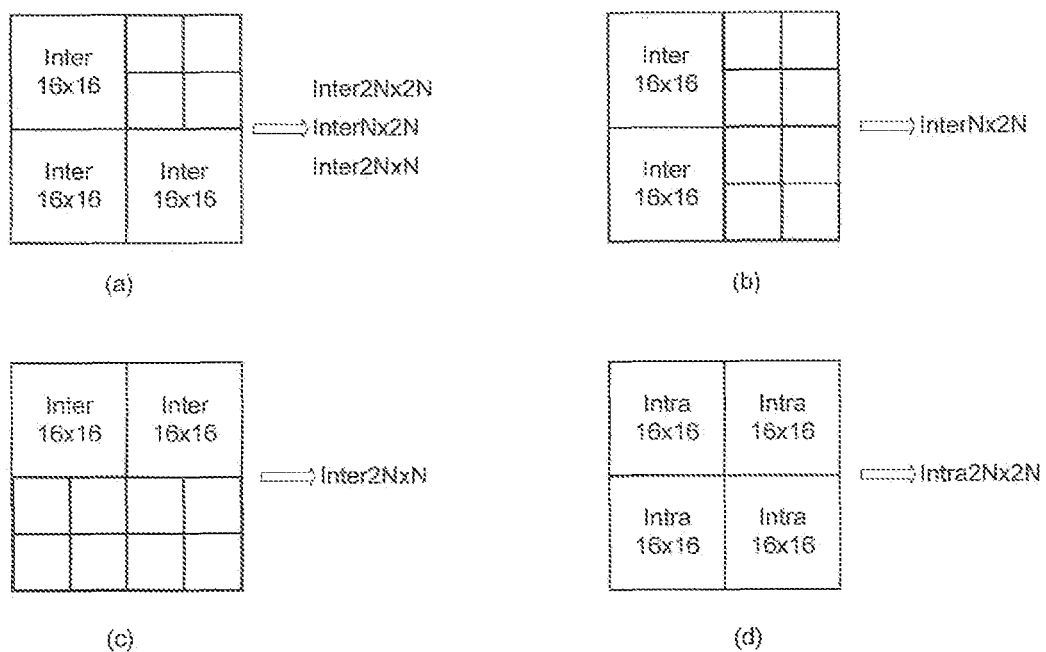
FIG. 7 depicts a fast mode determination process.

FIG. 7 depicts examples of a fast mode determination process. FIG. 7 depicts the various modes checked, in addition to Skip and Merge, based on the modes of the corresponding MBs. As depicted in FIG. 7 the 32×32 CU in (a) corresponds to 3 MBs encoded using Inter16×16 mode. Accordingly, Inter2N×2N mode is checked since there are more than 2 MBs using Inter16×16 mode. Also in (a), InterN×2N is checked since the leftmost MBs both use Inter16×16 mode. Finally in (a) Inter2N×N is checked since the bottom most two MBs both use Inter16×16 mode. In FIG. 7(b) the InterN×2N mode will be checked since the two leftmost MBs use Inter16×16. Similarly, in FIG. 7(c) Inter2N×N is checked since the two topmost MBs use Inter16×16. Finally, in FIG. 7(d) the Intra2N×2N mode is checked since more than two MBs use Intra modes, in fact all MBs use Intra16×16.

For the cases of other sizes, it is possible to use the same partition modes as the corresponding MBs in H.264/AVC. However if the H.264/AVC mode in that CU size does not exist, for example, a 8×8 CU and the corresponding MB uses a 16×16 mode, then Inter2N×2N mode in that size is checked.

With regard to the motion estimation for determining a partition's MV, again the problem can be divided into two parts according to the CU sizes. For 32×32CUs, the median method, which determines the motion estimation as the median from the four corresponding MBs provides good results. However, as HEVC uses its own motion vector (MV) predictor, the HEVC MV predictor is also taken into consideration when determining a MV. Accordingly, the median of the MVs from the four corresponding MBs and the HEVC MV predictor is determined and used as the final center for ME search.

For the case of other sizes, because the partition is used according to the partition chosen by H.264/AVC, the MV may also be set according to the MV in H.264/AVC does. However, if the H.264/AVC mode in that CU size does not exist, for example, a 8×8 CU and the corresponding MB uses a 16×16 mode, than the MV predictor from HEVC for the CU is used.

After setting the center of ME search, the best MV is searched for within 4 pixels around the center.

The fast mode decision for I frames is similar to that described above; however, because the partition modes of I frames can only be Intra2N×2N or IntraN×N, and IntraN×N is used only at the deepest depth, no optimizations are required for determining the mode of Intra coded blocks. Further, Intra coded frames, and blocks, do not have motion vectors. Accordingly, optimizations are used only for determining the block size partitioning as described above and determining prediction directions as described below.

Figure 8:
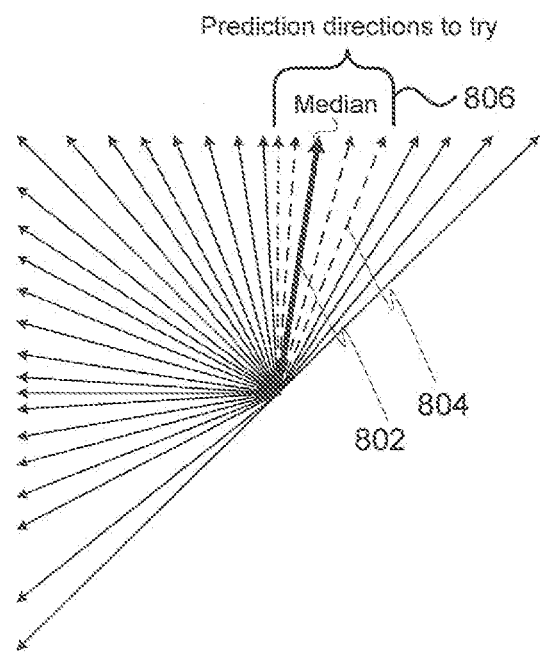
FIG. 8 depicts fast prediction direction determination.

FIG. 8 depicts fast prediction direction determination. Again, the fast prediction direction determination is broken into two cases, one for 32×32 CUs and the other for smaller CUs. For the 32×32 case, first the median prediction direction of the four corresponding MBs is determined and then the prediction direction to check are determined according to the following:

If the prediction direction of the median direction is DC, check Planar and DC mode; and If prediction direction of the median direction is directional, check Planar mode and five prediction directions 806 around, and including, the median direction 802 as is shown in FIG. 8.

In FIG. 8 the arrows represent the possible directions. The median prediction direction of the four corresponding MBs is depicted with a thick lined arrow 802 and the surrounding four directions which may be additionally checked are shown as dashed line arrows For the other sizes of CU, if the H.264/AVC uses the same partition, for example for an 8×8 CU, H.264 also encodes the MB as Intra 8×8, then the above technique for finding the direction is used. Otherwise, the prediction direction is determined in accordance with standard HEVC.

Figure 9:
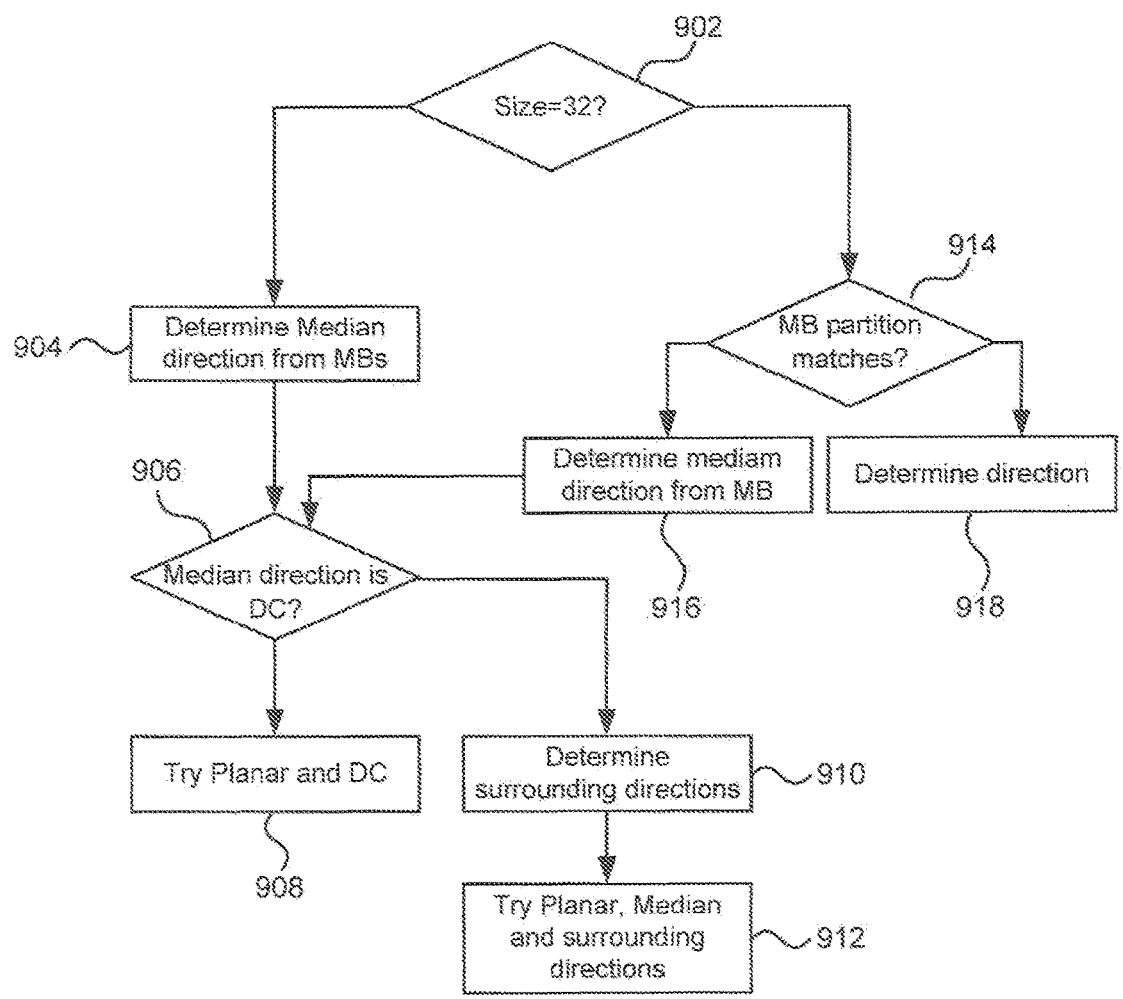
FIG. 9 depicts a method for fast determination of prediction directions.

FIG. 9 depicts a method for fast determination of prediction directions. The method 900 determines if the size of the CU is 32×32 (902) and if it is (Yes at 902), the median prediction direction of the four corresponding MBs is determined (904). Alternatively, if the CU is smaller than 32×32 (No at 902), it is determined if the MB partition matches the current partition (914) and if it does, the median prediction direction is determined from the corresponding CU (916). Regardless of how the median prediction direction is determined, it is checked to determine if it corresponds to DC (906) and if it does (Yes 906) Planar and DC prediction directions are checked (908). If the median direction does not correspond to DC (No at 906), than directions surrounding the median direction are determined (910) and the Planar, median direction and surrounding directions are checked (912). If it is determined that the CU smaller than 32×32 (No at 902) does not match the MB partition (No at 914), the direction is determined (918) as would be the case normally.

Once the above information is determined, the CUs are processed to generate the output bitstream. The processing involves the low level processing which may include various SIMD acceleration techniques.

Figure 10:
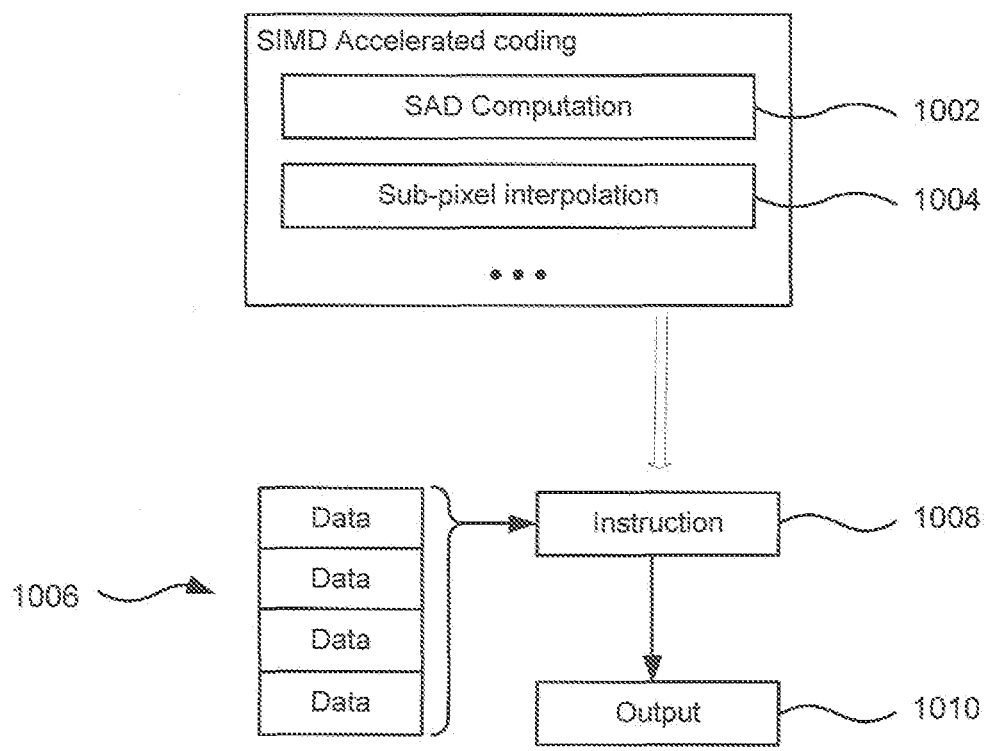
FIG. 10 depicts SIMD accelerated coding of partitions.

FIG. 10 depicts SIMD accelerated coding of partitions. As depicted, processing of the CUs requires various calculations to be performed on the CUs, including for example, SAD computations 1002, which calculates the sum of absolute differences between two matrixes, and Sub-pixel interpolatins (1004). Other calcularitons may also be accelerated using SIMD or other techniques. As depicted in FIG. 10, the SIMD accelerated calculations process multiple pieces of data 1006 according to a single instruction 1008 in order to provide encoded output information (1010) for the respective CU. The SIMD instructions sets may be, for example MMX or SSEx.

Traditionally, to fully exploit the benefit of SIMD instructions support for modern processors, assembly code had to been hand-written. However with modern state-of-the-art compilers such as the ICC (Intel C/C++ Compiler), it is possible to produce high quality SIMD code for many applications that previous would require hand-written assembly code. In real world applications, compilers are usually used to auto-vectorize the most simple routines to enable SIMD calculation, followed by hand-tuning of the more challenging functions.

The current transcoder implements various functions including TComRdCost::xGetSAD{8,16,32}( ), TComRdCost::xCalcHADs8×8( ) and TComInterpolationFilten:filter( ) using hand-written assembly code. Table 2 compares time consumption between original, hand-written and ICC-optimized code. According to the table, hand-written code is usually faster than compiler-generated code, however compiler generated code may be better in overall performance. The current transcoder, may use hand-written code, hand-optimized compiler generated code, compiler generated code or combinations thereof. For example, the transcoder may use hand-written code for ComRdCost::xGetSAD{8,16,32}( ) and TComRdCost::xCalcHADs8×8( ), and leave the rest to ICC.

TABLE 2

SIMD Optimization Comparison

| Computation Type | Original(s) | Hand-written(s) | ICC(s) |
|---|---|---|---|
| HAD Computation | 10.794 | 9.225 | 9.383 |
| Interpolation | 12.247 | 12.450 | 6.836 |
| SAD Computation | 10.019 | 2.839 | 5.057 |
| Total Time | 80.344 | 69.669 | 59.314 |

Figure 11:
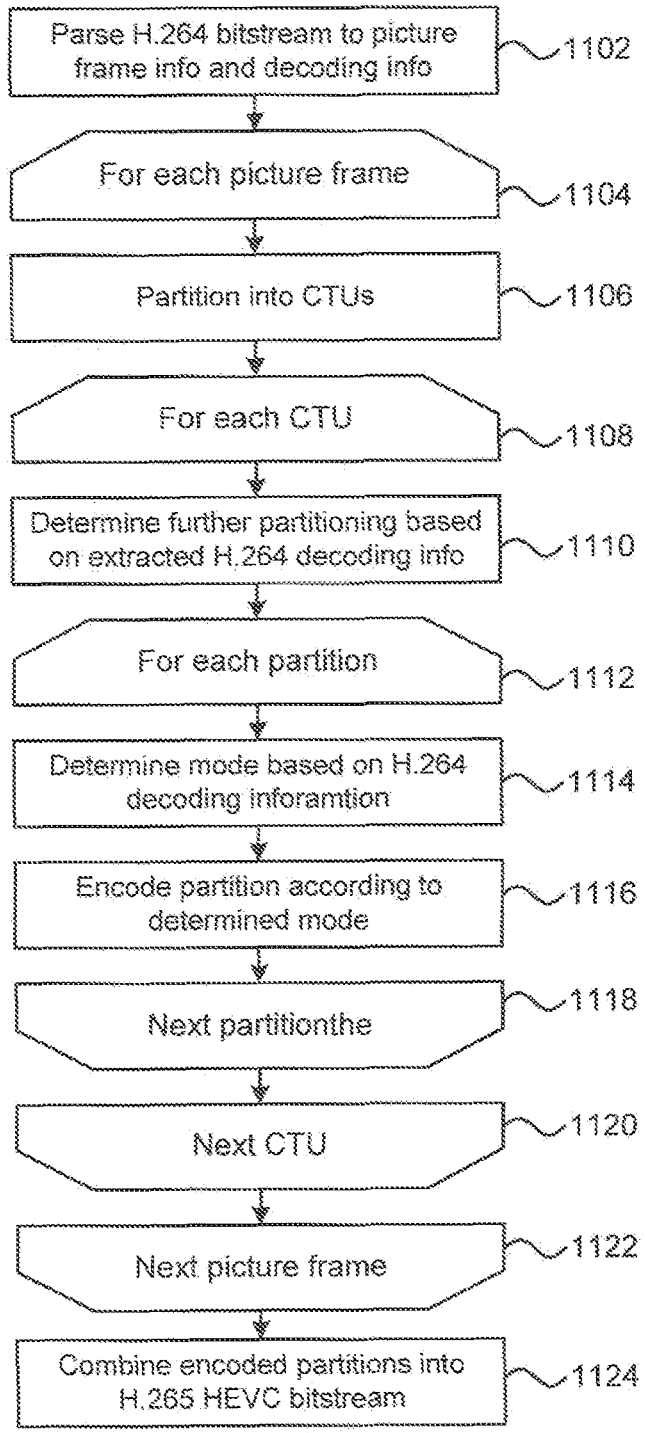
FIG. 11 depicts a method for generating an H.265 HEVC bitstream.

FIG. 11 depicts a method for generating an H.265 HEVC bitstream. The method 1100 receives and parses an H.264 bitstream (1102) in order to access encoded picture frames and the associated decoding information from the bitstream. For each of the picture frames (1104), the picture frame is partitioned into fixed size CTUs (1106). The CTU sizes may be 64×64, 32×32, 16×16 or 8×8; however as described above the benefit of the 64×64 CTU size may not be worth the extra computational cost. For each of the CTUs (1108), further portioning of the CTU is determined based on extracted H.264 decoding information (1110). Once the CTU is partitioned into CUs (and possibly PUs) then for each partition (1112) a mode is determined (1114) based on the extracted H.264 decoding information and the partition is encoded according to the mode (1116). The next partition is then processed (1118). Once the partitions of a CTU have been encoded, the next CTU is processed (1120). As described above if WPP is used, multiple CTUs may be processed in parallel. Once the CTUs of a frame are processed, the next picture frame (1122) is processed, and once all frames of the H.265 bitstream are processed, encoded partitions are combined into an H.265 bitstream (1124). The resultant H.265 bitstream will have the same resolution but lower bitrate, and a different format from the input H.264 bitstream.

In order to evaluate the performance of the current transcoder, a large number of experiments were conducted with HEVC standard test clips. The set of clips contains different levels of motion, texture and different resolutions. The following provides the results related to each step of the optimization of the transcoder, as well as overall performance comparisons. The HEVC HM8.1 reference software and the x264 H.264/AVC encoder were used as benchmarks. Overall, the described transcoder is 5 to 70 times faster than the HM8.1 implementation while achieving an average of 35% RD performance gain over the x264 H.264/AVC encoder. The tests were performed on a Quad Core 3.40 GHz CPU and 4 GB of RAM As shown in Table 3, the Wavefront Parallel Process implementation introduces virtually no loss in RD performance while achieving an average of 4× speedup. The speedup column is calculated according to $$\frac{(t_{original} - t_{WPP})}{t_{original}}.$$

The average bit rate increase was about 1%.

Figure 12:
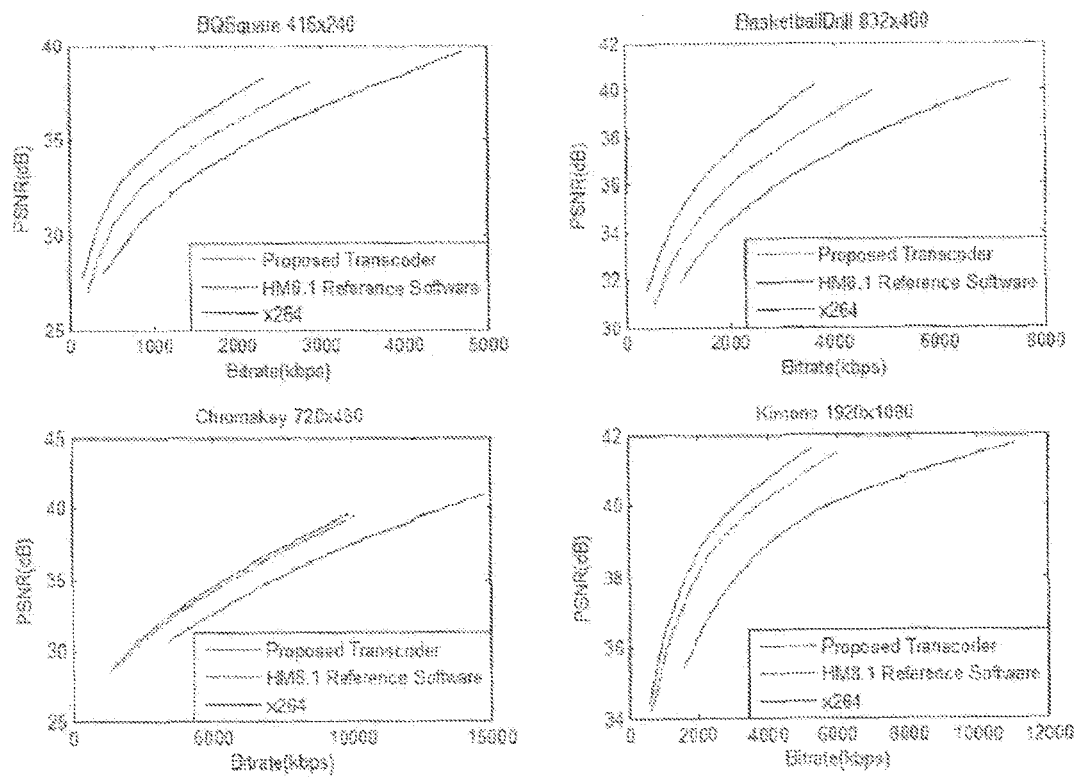
FIG. 12 depicts graphs of rate distortion (RD) performance.
Figure 13:
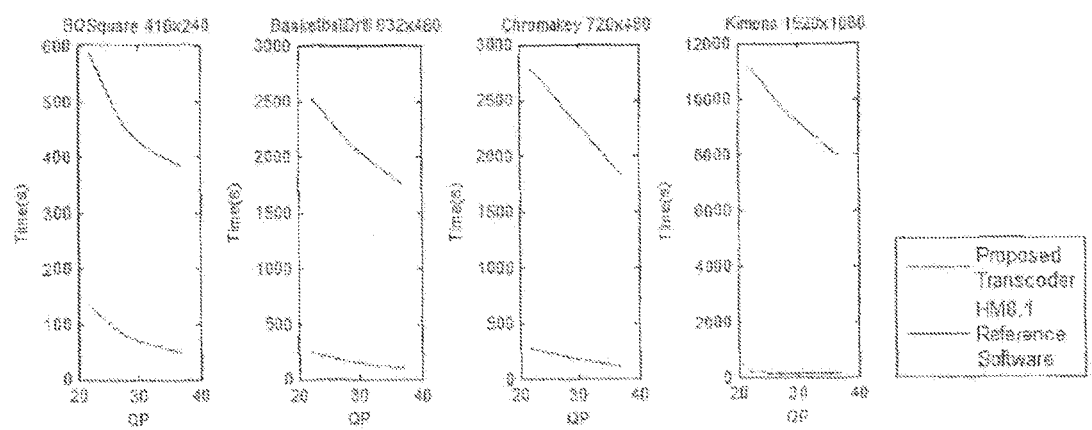
FIG. 13 depicts graphs of speedup performance.

FIG. 12 and FIG. 13 are results of RD performance and Speedup performance using all of the individual features described above. It is noted that with higher resolution, both RD performance and Speedup performance get better. Generally, the current transcoder may achieve about 35% RD gain over x264 H.264/AVC encoder and the encoding speed is about 3-6 frames per second. The design of Condition 1 and Condition 2 for stopping the block partitioning provides a good trade-off between speedup and RD lost.

TABLE 3

Performance with WPP Implementation

| Video Clip | QP | Original | | | WPP | | | |
| --- | --- | --- | --- | --- | --- | --- | --- | --- |
| | | Bitrate (kbps) | PSNR (dB) | Time (s) | Bitrate (kbps) | PSNR (dB) | Time (s) | Speedup (%) |
| BasketballDrill | 22 | 3620.8 | 40.23 | 2541.6 | 3667.4 | 40.23 | 676.4 | 73.4 |
| (832 × 480) | 27 | 1690.7 | 37.01 | 2204.5 | 1725.1 | 37.02 | 586.5 | 73.4 |
| | 32 | 805.1 | 34.07 | 1949.0 | 832.8 | 34.08 | 519.8 | 73.3 |
| | 37 | 413.5 | 31.53 | 1750.6 | 435.8 | 31.51 | 470.7 | 73.1 |
| Kimono | 22 | 5254.5 | 41.62 | 11157.0 | 5302.2 | 41.62 | 2494.7 | 77.6 |
| (1920 × 1080) | 27 | 2426.8 | 39.58 | 9764.9 | 2463.5 | 39.58 | 2231.3 | 77.2 |
| | 32 | 1172.9 | 37.04 | 8778.2 | 1205.8 | 37.04 | 2121.5 | 75.8 |
| | 37 | 584.1 | 34.43 | 7950.1 | 607.9 | 34.42 | 1826.0 | 77.0 |

Table 4 shows that SIMD acceleration maintains the same R-D performance while achieving a 25% reduction in overall processing time as compared with HEVC encoding. The speedup column is calculated by $$\frac{(t_{original} - t_{WPP})}{t_{original}}.$$

Various transcoder features for an optimized H.264/AVC to HEVC trans coder targeting multi-core processors were described above. By utilizing information extracted from the H.264/AVC bitstream, WPP processing, fast partitioning and mode decision algorithms as well as SIMD accelerations, the described system may achieve an approximately 100× speedup compared with the HEVC HM 8.1 reference software and a 35% bitrate reduction compared with the widely used x264 H.264/AVC implementation.

TABLE 4

Performance with SIMD Accelerations

| | | Time (s) | | | | | Time (s) | | |
| --- | --- | --- | --- | --- | --- | --- | --- | --- | --- |
| Video Clip | QP | Original | SIMD | Speedup (%) | Video Clip | QP | Original | SIMD | Speedup (%) |
| BasketballDrill | 22 | 2541.6 | 1901.6 | 25.2 | Kimono | 22 | 11157.0 | 7954.2 | 28.7 |
| (832 × 480) | 27 | 2204.5 | 1586.7 | 28.0 | (1920 × 1080) | 27 | 9764.9 | 6863.4 | 29.7 |
| | 32 | 1949.0 | 1387.8 | 28.8 | | 32 | 8778.2 | 6014.2 | 31.5 |
| | 37 | 1750.6 | 1231.8 | 29.6 | | 37 | 7950.1 | 5432.5 | 31.7 |

Table 5 shows that the performance of the acceleration with H.264/AVC information increases when QP increases and resolution increases. For the resolution of 832×480, it is possible to achieve about a 2× to 3× speed up while for the resolution of 1920×1080 it is possible to achieve about 10× to 15×.

The hardware, software, firmware and combinations thereof providing the above described functionality may reside in the same physical systems, or may be distributed in multiple devices and/or systems.

Although specific embodiments are described herein, it will be appreciated that modifications may be made to the

TABLE 5

Performance with H.264/AVC Information

| | | Time (s) | | | | | Time (s) | | |
| --- | --- | --- | --- | --- | --- | --- | --- | --- | --- |
| Video Clip | QP | Original | Proposed | Speedup (%) | Video Clip | QP | Original | Proposed | Speedup (%) |
| BasketballDrill | 22 | 2541.6 | 1119.4 | 56.0 | Kimono | 22 | 11157.0 | 1312.7 | 88.2 |
| (832 × 480) | 27 | 2204.5 | 897.6 | 59.3 | (1920 × 1080) | 27 | 9764.9 | 1046.3 | 89.3 |
| | 32 | 1949.0 | 762.8 | 60.9 | | 32 | 8778.2 | 515.0 | 94.1 |
| | 37 | 1750.6 | 440.7 | 74.8 | | 37 | 7950.1 | 451.0 | 94.3 | embodiments without departing from the scope of the current teachings. Accordingly, the scope of the appended claims should not be limited by the specific embodiments set forth, but should be given the broadest interpretation consistent with the teachings of the description as a whole.

What is claimed is:

1. A method for generating an H.265 HEVC bitstream comprising:
parsing a previously H.264/AVC encoded bitstream to extract picture frame information and decoding information, the decoding information is H.264 decoding information;
for each picture frame of the picture frame information:
partitioning the picture frame into a plurality of coding tree units (CTUs), wherein partitioning CTUs by:
determining a stop predictor value (P);
stopping further partitioning when P is greater than a threshold value; and
further partitioning the CTU until a rate distortion (RD) value of a current partition is greater than alpha times an RD value of a partition at a previous division depth, wherein:

$$\text{alpha} = 1 - \frac{w - 400}{1000},$$

w is a video width between 400 to 1400:
determining further partitioning of each CTU of the plurality of CTUs based on the extracted decoding information;
determining a mode for each partition based on the decoding information; and
encoding each partition according to the determined mode; and
combining the encoded partitions into the H.265 HEVC bitstream.

2. The method of claim 1, wherein the plurality of CTUs of the picture frame are processed using Wavefront Parallel Processing (WPP).

3. The method of claim 1, wherein a size of the CTUs is one of 32×32, 16×16 or 8×8.

4. The method of claim 1, wherein the decoding information used in determining the mode for each partition comprises a mode of macroblocks (MB) in the previously encoded bitstream.

5. The method of claim 1, wherein the mode is determined from one of:
Inter2N×2N;
InterN×2N;
Inter2N×N;
Intra2N×1N;
Skip; and
Merge.

6. The method of claim 5, wherein
the Skip and Merge modes are always checked;
the Inter2N×2N mode is checked when there are more than 2 MBs using Inter16×16 mode;
the InterN×2N mode is checked when left two MBs, or right two MBs both use Inter16×16 mode;
the Inter2N×N mode is checked when upper two MBs or lower two MBs both use Inter16×16 mode; and
the Intra2N×2N mode is checked when there exists more than 2 MBs using Intra modes.

7. The method of claim 1, further comprising:
determining a plurality of prediction directions to check for a partition based on a median of prediction directions of corresponding macroblocks determined from the decoding information.

8. The method of claim 1, further comprising:
determining a motion vector (MV) for 32×32 partitions based on a median of an HEVC MV predictor and MVs of macroblocks (MB) corresponding to 32×32 partitions from the H.264 decoding information; and
determining a MV for smaller partitions having a corresponding MB according to the MV of the corresponding MB.

9. The method of claim 1, wherein:

$$P = P1 + P2 + P3; \tag{1}$$

$$P1 = \frac{w - 400}{20} + (QP - 20) * 2; \text{ and} \tag{2}$$

$$P2 = (n - 2) * 10; \tag{3}$$

where
QP is a quantization value between 20 and 40;
n is a number of 16×16 mode blocks of four macroblocks (MBs) covered by a 32×32 CTU; and
if stopping further partitioning a previous frame or not is determined by the value of P, then P3=10, otherwise P3=−10.

10. A computing system for generating an H.265 HEVC bitstream comprising:
a processor for executing instructions stored in memory; and
a memory storing instructions, which when executed by the processor configure the computing system to:
parse a previously H.264/AVC encoded bitstream to extract picture frame information and decoding information, the decoding information is H.264 decoding information;
for each picture frame of the picture frame information:
partition the picture frame into a plurality of coding tree units (CTUs), wherein the instructions when executed by the processor further configure the system to partition CTUs by:
determining a stop predictor value (P);
stopping further partitioning when P is greater than a threshold value; and
further partitioning the CTU until a rate distortion (RD) value of a current partition is greater than aloha times an RD value of a partition at a previous division depth, wherein:

$$\text{alpha} = 1 - \frac{w - 400}{1000},$$

w is a video width between 400 to 1400;
determine further partitioning of each CTU of the plurality of CTUs based on the extracted decoding information;
determine a mode for each partition based on the decoding information; and
encode each partition according to the determined mode; and
combine the encoded partitions into the H.265 HEVC bitstream.

11. The system of claim 10, wherein the plurality of CTUs of the picture frame are processed using Wavefront Parallel Processing (WPP).

12. The system of claim 10, wherein a size of the CTUs is one of 32×32, 16×16 or 8×8.

13. The system of claim 10, wherein the H.264 decoding information used in determining the mode for each partition comprises a mode of macroblocks (MB) in the previously encoded bitstream.

14. The system of claim 11, wherein the mode is determined from one of:
Inter2N×2N;
InterN×2N;
Inter2N×N;
Intra2N×1N;
Skip; and
Merge.

15. The system of claim 14, wherein
the Skip and Merge modes are always checked;
the Inter2N×2N mode is checked when there are more than 2 MBs using Inter16×16 mode;
the InterN×2N mode is checked when left two MBs, or right two MBs both use Inter16×16 mode;
the Inter2N×N mode is checked when upper two MBs or lower two MBs both use Inter16×16 mode; and
the Intra2N×2N mode is checked when there exists more than 2 MBs using Intra modes.

16. The system of claim 10, wherein the instructions when executed by the processor further configure the system to: determine a plurality of prediction directions to check for a partition based on a median of prediction directions of corresponding macroblocks determined from the decoding information.

17. The system of claim 10, wherein the instructions when executed by the processor further configure the system to:
determine a motion vector (MV) for 32×32 partitions based on a median of an HEVC MV predictor and MVs of macroblocks (MB) corresponding to 32×32 partitions from the decoding information; and
determining a MV for smaller partitions having a corresponding MB according to the MV of the corresponding MB.

18. The system of claim 10, wherein:

$$P = P1 + P2 + P3; \quad (1)$$

$$P1 = \frac{w - 400}{20} + (QP - 20) * 2; \text{ and} \quad (2)$$

$$P2 = (n - 2) * 10; \quad (3)$$

where
QP is a quantization value between 20 and 40;
n is a number of 16×16 mode blocks of four macroblocks (MBs) covered by a 32×32 CTU; and
if stopping further partitioning a previous frame or not is determined by the value of P, then P3=10, otherwise P3=−10.

* * * * *